Sheet 1. 3 Sheets

JOHN T. WILSON.

Dies for Cutting Face-Plates.

117954  PATENTED AUG 8 1871

Witnesses.
D. R. Cowl
Edmund Masson

John T. Wilson.
By atty A. V. Stoughton.

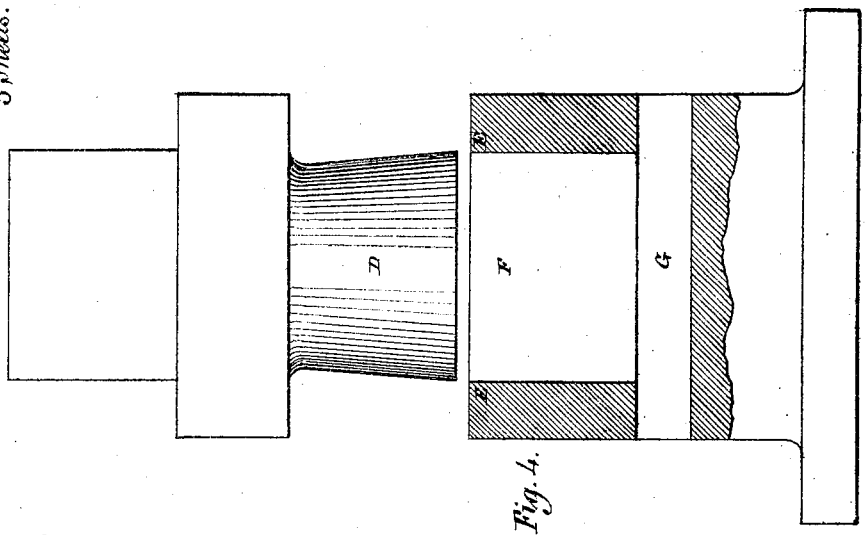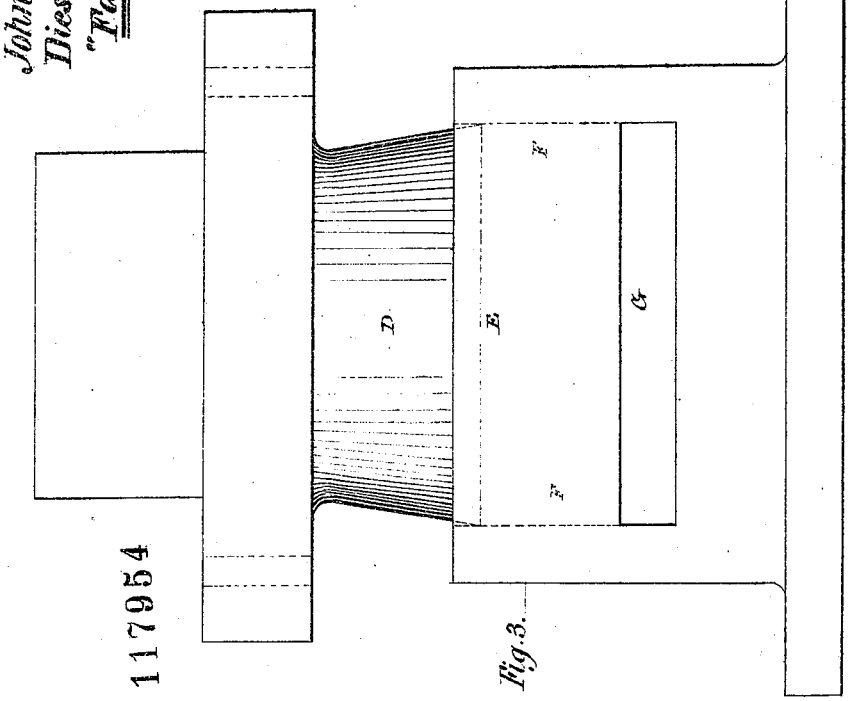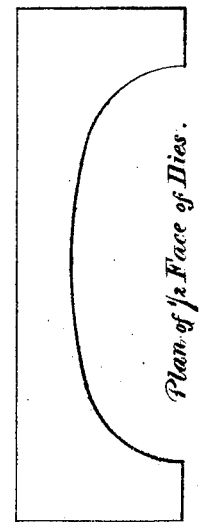

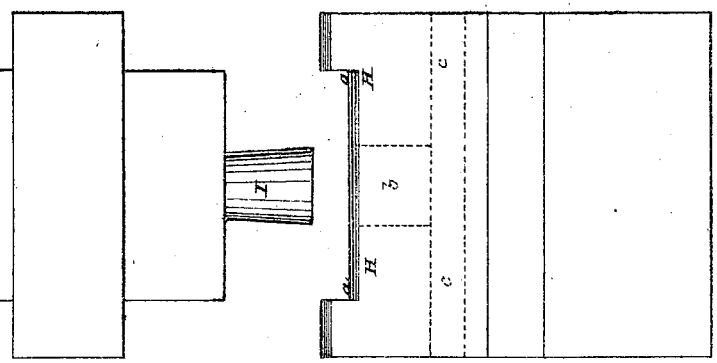
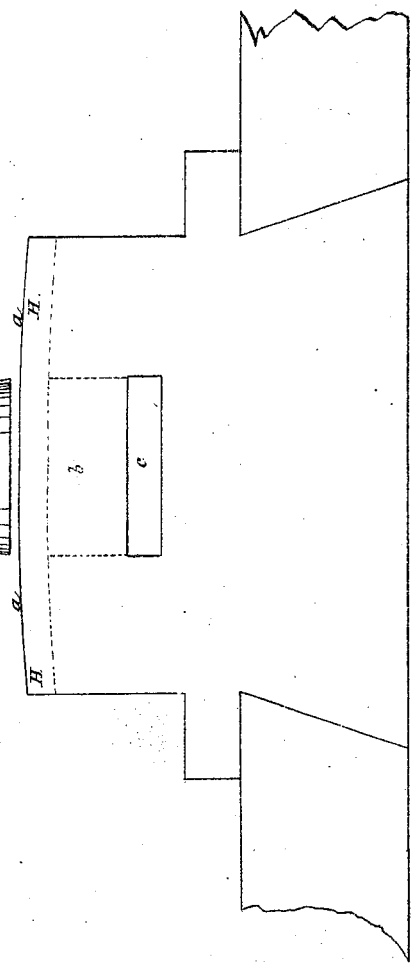
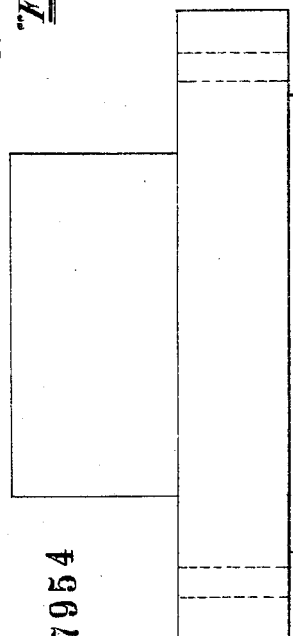

UNITED STATES PATENT OFFICE.

JOHN T. WILSON, OF PITTSBURG, PENNSYLVANIA.

IMPROVEMENT IN DIES FOR MANUFACTURING DRAW-HEAD FACE-PLATES FOR RAILROAD COUPLINGS.

Specification forming part of Letters Patent No. 117,954, dated August 8, 1871.

*To all whom it may concern:*

Be it known that I, JOHN T. WILSON, of Pittsburg, in the county of Allegheny and State of Pennsylvania, have invented certain new and useful Improvements in Manufacture of Draw-Head Face-Plates for Railroad-Car Couplings; and I do hereby declare the following to be a full, clear, and exact description of the construction of the same, reference being had to the accompanying drawing making a part of this specification, in which—

Figure 1:
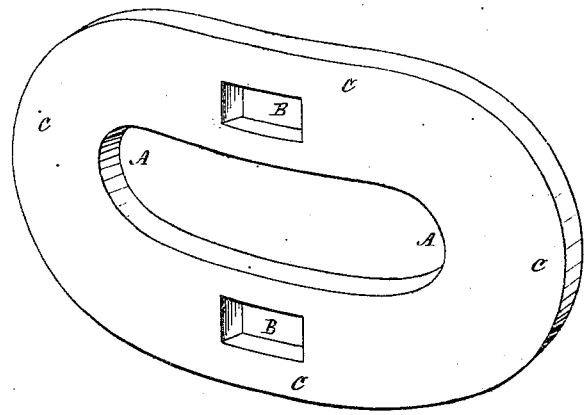
Figure 2:
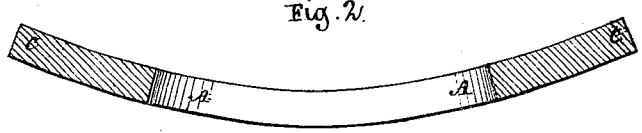

Figure 1 represents, in perspective, one of the face-plates in question. Fig. 2 represents a section through the same. Figs. 3, 4, 5, 6, and 7 represent dies by which the face-plates are cut, punched, and shaped.

Draw-head face-plates have generally been made of cast-iron, but some have been made of wrought-iron upon an anvil. The cast-iron ones have the advantage of uniformity of shape and size, which facilitates the uniting of the other necessary parts to them, and of cheapness; but their liability to break under the strains and blows they receive, unless made extraordinarily heavy, which is equally objectionable, renders them unsafe and undesirable. Those that have been hammered or wrought out by hand are too expensive and very difficult to get of such uniform shape and size as to be interchangeable or easily assembled with the other parts or pieces which go to make up a car-coupling, as it is usually termed, and the expense of such hand-made face-plates prevents them from going into general use.

My invention consists in a drop-die for cutting, punching, and bending face-plates for car-couplings, and counter-die, by which means I not only expedite and cheapen the production, but I make such plates so uniform in shape and size, and curvature and position of their slots or openings, as to easily and readily fit them to the other parts or pieces with which they act to form a car-coupling.

The plates or bars of iron out of which these face-plates are punched should be of piled iron, with the fiber laid crosswise so as to give them uniform strength in lateral and transverse directions. The bar is fed in upon a counter-die or bed, of convex form, and in a suitably heated condition, and in a gauged position. The drop-die, which is of convex form, and furnished with a punch of suitable size, drops upon the heated plate or bar, and at one operation it is cut out in its oval form C with sharp true edges, and at another operation is bent into its necessary curvature, and its center A slotted or punched out at the same operation. The openings B B into which the top and bottom bars are set and riveted are made at a separate operation, it being found to be inexpedient to do the whole at one operation. It may, however, be done at one heat, and by simply shifting the piece from the drop-die to a punching-die, and by this means the same accuracy of position of these holes is maintained.

Drop-dies for punching out metal into forms are well known; but it is rare, because very expensive and hard on the dies, to cut out metal of the thickness required for these face-plates by such dies. In my case the face-plates are so accurately and truly shaped and formed as to require but very little hand-dressing. Besides, the surfaces which are struck by the drop, and driven against the counter-die, are smooth, compact, and in a finished state not attainable when wrought out with a hammer upon a common anvil, as heretofore done.

In Figs. 3 and 4, which represent, respectively, a side and end view of the die and counter-die for punching out the blank, the drop-punch or die is represented at D and the anvil or counter-die at E. The blank when punched out is driven down through the opening F in the counter-die and then taken out through the opening G. In Fig. 5 one-half the face of the dies is shown. The blank thus punched out is flat, and is placed on the counter-die H, Figs. 6 and 7, and the drop-die I is let fall or forced down upon it. The punch on the drop I cuts out the central opening A, and at the same time the curvature of the die and counter-die, as at $a\,a$, gives the face-plate its proper curvature. The piece punched out of the center of the plate drops through the opening $b$ and is taken out at $c$. The holes at B B, as above stated, are afterwards punched out by any of the ordinary processes.

Having thus fully described my invention, what I claim is—

The drop and counter-die, substantially as herein described, for cutting out, punching, and bending draw-head face-plate for railroad-car couplings, as and for the purpose described and represented.

JOHN T. WILSON.

Witnesses:
A. B. STOUGHTON,
EDMUND MASSON.